M. YOUNG.
COMPOUND TOOL.
No. 177,977. Patented May 30, 1876.
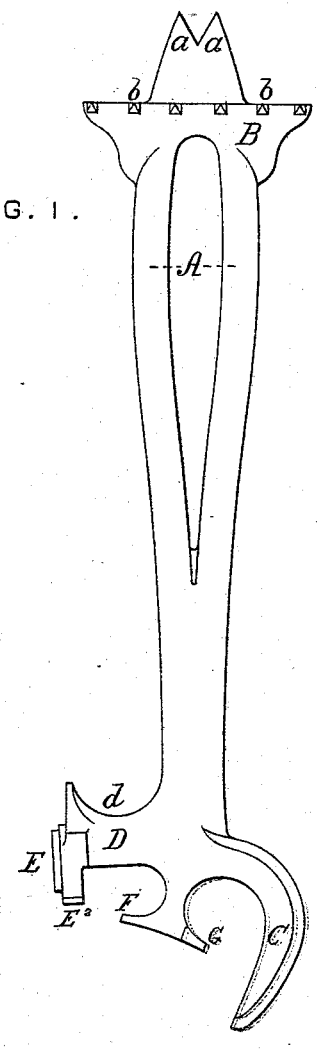
FIG. 1.
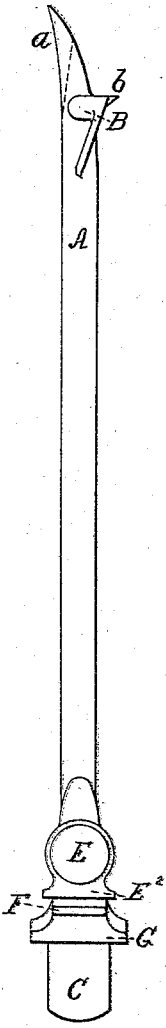
FIG. 2.
FIG. 3.
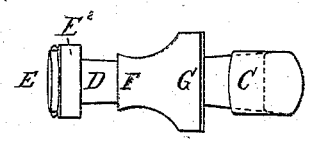
FIG. 4.
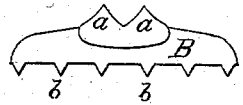
WITNESSES:
John Cook
C. O. Gordon
Martin Young by Sidney Doane atty
INVENTOR.

UNITED STATES PATENT OFFICE.

MARTIN YOUNG, OF NEW YORK, N. Y.

IMPROVEMENT IN COMPOUND TOOLS.

Specification forming part of Letters Patent No. 177,977, dated May 30, 1876; application filed April 19, 1876.

*To all whom it may concern:*

Be it known that I, MARTIN YOUNG, of the city, county, and State of New York, have invented, made, and applied to use, a new and useful Combination Implement, applicable to various purposes; and that the following is a full, clear, and correct description of the same, reference being had to the accompanying drawing, making part of this specification, and to the letters of reference marked thereon, in which—

Figure 1 is a front view of my invention. Fig. 2 is a side view of the same. Fig. 3 is a view of the front or forward end of the implement. Fig. 4 is a top view of the rear or back end of the implement.

In the drawing, like parts of the invention are pointed out by the same letters of reference.

The nature of the present invention consists in the construction, as more fully hereinafter set forth, of a combination implement for domestic purposes, in which are combined a carpet-stretcher, a tack-holder and extractor, a stove-lid lifter, a hammer, a kettle-lifter, and a pan-lifter; the object of the invention being the production of a combination implement for domestic purposes which can be manufactured and sold at a low price.

To enable those skilled in the art to make and use my invention, I will describe the construction and operation of the same.

A shows the handle of my combination implement, formed of any suitable metal, the forward end of which is curved upward, and has a portion of the metal of which it is composed cut away and hollowed out, so that two jaws, $a\ a$, are formed, between which the tack to be subsequently driven into the carpet is received. B shows a cross-piece extending across and projecting beyond the sides of the handle A, formed with a series of projecting points, $b$, upon its under side. These points $b$ are intended, when the implement is used as a carpet-stretcher, to enter the material of which the carpet is made, and, by pressure upon the handle A, to stretch the carpet properly. The opposite or rear end of the implement is provided with the curved projecting plate of metal C, intended as a stove-plate lifter; also with the projecting plate of metal D, being curved upon its upper side, as at $d$, intended to receive the bail of a pot or kettle, and thus facilitate the removal of the same from a cooking range or stove. The metal of which this plate D is formed is flattened, and rounded upon its face, as at E, and forms a hammer, and the portion projecting beyond the hammer is flattened upon its face, and forms a jaw, $E^2$, constituting, when combined with the jaw F, a pan-lifter. The jaw F is formed by continuing the metal of which the handle is made a short distance, and then curving it outward, so that the jaw F is formed, which co-operates with the jaw $E^2$, and forms a pan-lifter, as described, as well as the jaw G, co-operating with the curved plate of metal C, as a stove-plate lifter.

Such being the construction the operation may be thus described. When used as a carpet-stretcher the projecting points $b$, upon the under side of the cross-piece B, are inserted in the carpet, and the implement being pressed forward by the hand of the operator, the carpet is stretched, the tack to be driven into the carpet is inserted and retained between the jaws $a$, and when used as a tack drawer or extractor the forward ends of these jaws are placed beneath the head of the tack, and the handle A being pressed down, the tack is raised and drawn from the carpet, the points $b$ serving as a fulcrum.

When to be used as a stove-plate lifter, the forward end of the curved plate of metal C is inserted in the slotted portion of the plate, and the same is easily removed. The bail of the pot or kettle is received over and upon the curved upper side $d$ of the plate D, and may be lifted from the stove or range.

The use of the hammer E needs no description, and when desired to remove a pan from an oven or from a stove, the jaw $E^2$ has its bearing upon the outer side of the pan, while the jaw F projects over the edge of the pan, and has its bearing upon the inner side of the same, and the pan being held or clamped between these two surfaces, may be removed.

The implement, as already stated, can be sold at a low price, and will be found very useful for domestic purposes.

Having now set forth my invention, what I claim as new is—

As a new article of manufacture, a combination implement, comprising a carpet-stretcher, B b, a tack-holder, a, a stove-plate lifter, C, a hammer, E, a kettle-lifter, D, pan-lifter $E^2$ F, and handle A, constructed and operating substantially as and for the purposes set forth.

MARTIN YOUNG.

Witnesses:
   A. SIDNEY DOANE,
   W. H. HICKS.